Patented Apr. 14, 1936

2,036,997

UNITED STATES PATENT OFFICE 2,036,997

PROCESS FOR STABILIZING CHLORINATED RUBBER

Karl Bromig, Frankfort-on-the-Main, Germany, assignor to Deutsche Gold- und Silber-Scheideanstalt vormals Roessler, Frankfort-on-the-Main, Germany, a corporation of Germany No Drawing. Application March 22, 1935, Serial No. 12,519. In Germany April 3, 1934

12 Claims. (Cl. 260—1)

The object of my invention is a process for stabilizing chlorinated rubber.

It is well known that products obtained by chlorinating rubber, for example in suitable solvents, contain the chlorine in part very closely combined, in part however in an extremely labile condition, so that on storing the product separation of hydrogen chloride very soon takes place.

Attempts have therefore already been made to stabilize the chlorinated product by treatment with various alkaline-reacting media. The stability numbers of the resulting products, i. e. the time intervals required by a 30% solution of the chlorinated rubber in xylene to turn red congo paper, suspended 5 cms. above the surface of the liquid, blue on heating to 100 degrees centigrade, however amounted to from only a few minutes to a maximum of a few hours. Thus, for example, commercial stabilized chlorinated rubber products of this kind on carrying out the aforesaid test have proved to be stable for from 2 to 10 hours and at the best for 20 hours, before the congo paper after the expiry of this time showed a distinct blue owing to the separation and liberation of the hydrogen chloride.

The present invention is based on the discovery that considerably more stable products may be obtained by treating the dissolved products, obtained by chlorinating rubber in solvents, such as carbon tetrachloride, chloroform, xylene or the like, after completion of the chlorinating process, with small quantities of alkali salts of organic acids, which are themselves soluble in the solvents employed and whose salts are likewise to a certain degree soluble in these solvents.

Suitable acids as aforesaid are, for example, hydrocyanic acid, fatty acids, such as propionic acid, stearic acid and palmitic acid, oleic acid or the like. Thus, for example, salts, such as sodium cyanide, sodium stearate, sodium oleate or the like, may be employed for the aforesaid purpose, individually or in admixture with one another. A soap, obtained by saponifying coconut oil, has for example proved to be serviceable and particularly suitable. The combined application of different stabilizing agents according to the invention, for example by first adding alkali cyanide and then alkali salts of the fatty acids or oleic acid, by adding a mixture of both agents or by first adding the alkali salts of the fatty acids and the like and subsequently introducing the alkali cyanide, has proved to be particularly advantageous.

The form in which the alkali salts are employed in the process of this invention may be selected according to the prevailing conditions, they may for example be employed in solid, preferably finely powdered, form or alternatively in the form of solutions in the same organic solvents as are used for dissolving the chlorinated rubber or in other solvents of a similar kind. Finally the alkali salts may be employed in the form of their aqueous solutions, the solution of the chlorinated rubber in this case being vigorously stirred or emulsified with the aqueous alkali salt solution.

According to my invention it has been found that the treatment of the finished chlorinated rubber solutions with small quantities of alkali salts may be carried out at ordinary temperatures; in order to accelerate the action and to shorten the times of treatment, however, I may also effect the operation at elevated temperatures.

According to my invention I have further found that it is particularly advantageous to heat or boil the solutions of the chlorinated rubber in organic solvents, such as carbon tetrachloride or the like before causing the alkali salts employed to act upon the same. As a result of this heat treatment a part of the hydrogen chloride formed is already removed, so that relatively small quantities of stabilizing agents are sufficient to obtain the desired degree of stabilization.

The process of my invention is for example carried into effect by adding to an approximately 10–15% solution of chlorinated rubber in carbon tetrachloride 0.5–1.5% of sodium cyanide calculated on the chlorinated rubber in solution. Another method of operating comprises treating the chlorinated rubber solution, for example with sodium stearate. In this case such quantities of stearate are with advantage employed, that the solution remains practically free from turbidity. In all cases the solutions are allowed to stand for a certain time, for example for several hours, at ordinary or elevated temperature. If the stabilizing agents are employed in solid form they are preferably suspended in a very finely powdered condition in the same solvent as is used for dissolving the chlorinated rubber and the suspension thoroughly mixed with the chlorinated rubber solution. Mixing is in this case preferably carried out at elevated temperature in order to accelerate the action. When the stabilizing agents are added in solid form to the chlorinated rubber solution addition of about 2% calculated on the chlorinated rubber is for example employed.

Products of extraordinary stability are obtained by the process of my invention, for example products which have proved to be completely stable for 80, 100 and more hours.

The following examples serve to illustrate how the process of my invention may be carried into effect:

Example 1.—To 100 kgms. of chlorinated rubber dissolved in 750 kgms. of carbon tetrachloride, obtained by treating rubber with chlorine, there are added 0.8–1.2 kgms. of sodium cyanide, which has been finely ground with carbon tetrachloride in a ball mill, and the mixture is allowed to stand for 10 hours at 15–20° C. with stirring. The chlorinated rubber is then freed from solvent either in a vacuum roller drier or by precipitation with methanol and dried. It is distinguished by high stability, light colour and practically unchanged viscosity.

Example 2.—40 kgms. of rubber are dissolved in chlorobenzene and converted by the action of chlorine into chlorinated rubber. The solution, which at the conclusion of the chlorination contains 100 kgms. of chlorinated rubber, is heated to boiling and maintained for 1 hour at boiling temperature. After cooling, 1.5 kgms. of sodium stearate, which has been previously thoroughly ground with chlorobenzene, is allowed to run in and the mixture is allowed to stand for about 10–12 hours with slight increase of temperature and stirring. The chlorinated rubber is recovered from the solution in known manner, for example as indicated in Example 1.

Example 3.—0.4 kgm. of a finely ground cyanide is added to a solution of 100 kgms. of chlorinated rubber in 750 kgms. of carbon tetrachloride, which after boiling has been cooled to about 45° C. After 4 hours the mixture is allowed to cool and 0.6 kgm. of sodium stearate is added. The reaction mixture is then allowed to stand with thorough stirring for a further 10 hours and is then worked up by the method indicated in Example 1.

It has already been proposed to produce chlorinated rubber by chlorinating solutions of rubber in the presence of very large quantities of acid-fixing substances with simultaneous or subsequent heating to 60–90° C. Alkali or alkaline earths carbonates or bicarbonates, alkaline earths oxides or hydroxides, magnesium oxides, sodium acetate and the like have been employed as acid-fixing substances in quantities amounting to 200–500% of the weight of the rubber.

In contradistinction to these known processes very small quantities of stabilizing agents, amounting, for example, only to 0.5–2%, are employed according to my invention. These small quantities of stabilizing agents are, moreover, not added to the rubber solutions during the process of chlorination, but to the finished chlorinated rubber solutions after completion of the chlorinating process. In addition to effecting economies in stabilizing agents the process of this invention has the advantage that it yields satisfactory products even at ordinary temperature and is with advantage carried out under gentle heating, for example to 45° C. only when employing solid stabilizing agents.

What I claim is:

1. A process for stabilizing chlorinated rubber which consists in treating finished solutions of the chlorinated rubber in organic solvents with small quantities of alkali metal salts of organic acids, selected from the group consisting of hydrocyanic acid and fatty acids of high molecular weight.

2. A process for stabilizing chlorinated rubber which consists in treating finished solutions of the chlorinated rubber in carbon tetrachloride with small quantities of alkali metal salts of organic acids, selected from the group consisting of hydrocyanic acid and fatty acids of high molecular weight.

3. A process for stabilizing chlorinated rubber which consists in treating finished solutions of the chlorinated rubber in organic solvent with small quantities of alkali metal salts of the group propionic acid, stearic acid, oleic acid.

4. A process for stabilizing chlorinated rubber which consists in treating finished solutions of the chlorinated rubber in organic solvent with small quantities of alkali metal salts of hydrocyanic acid.

5. A process for stabilizing chlorinated rubber which consists in treating finished solutions of the chlorinated rubber in organic solvent with not more than 2 percent of an alkali metal salt of organic acids selected from the group consisting of hydrocyanic acid and fatty acids of high molecular weight.

6. A process for stabilizing chlorinated rubber which consists in treating finished solutions of the chlorinated rubber in organic solvent with 0.5 to 1.5 percent of an alkali metal salt of organic acids selected from the group consisting of hydrocyanic acid and fatty acids of high molecular weight.

7. A process for stabilizing chlorinated rubber which consists in treating finished solutions of the chlorinated rubber in organic solvents with small quantities of alkali metal salts of organic acids, selected from the group consisting of hydrocyanic acid and fatty acids of high molecular weight, effecting the treatment at ordinary temperature.

8. A process for stabilizing chlorinated rubber which consists in treating finished solutions of the chlorinated rubber in organic solvents with small quantities of alkali metal salts of organic acids, selected from the group consisting of hydrocyanic acid and fatty acids of high molecular weight, effecting the treatment by adding the alkali metal salts dissolved in a solvent which is similar to the solvent used for dissolving the chlorinated rubber.

9. A process for stabilizing chlorinated rubber which consists in treating finished solutions of the chlorinated rubber in organic solvents with small quantities of alkali metal salts of organic acids, selected from the group consisting of hydrocyanic acid and fatty acids of high molecular weight, effecting the treatment by adding the alkali metal salt in a dry powdered form.

10. A process for stabilizing chlorinated rubber which consists in treating finished solutions of the chlorinated rubber in organic solvents with small quantities of alkali metal salts of organic acids, selected from the group consisting of hydrocyanic acid and fatty acids of high molecular weight, effecting the treatment by adding the alkali metal salt in a dry powdered form raising the temperature of the chlorinated rubber solution during the treatment.

11. A process for stabilizing chlorinated rubber which consists in heating the finished solutions of chlorinated rubber in order to remove the major portion of the dissolved hydrochloric acid, cooling said solution and treating the cooled solution with small quantities of alkali metal salts of organic acids selected from the group consisting of hydrocyanic acid and fatty acids of high molecular weight.

12. A process for stabilizing chlorinated rubber which consists in heating the finished solutions of chlorinated rubber in order to remove the major portion of the dissolved hydrochloric acid, cooling said solution and treating the cooled solution with small quantities of a mixture of an alkali metal salt of hydrocyanic acid and an alkali metal salt of a fatty acid of high molecular weight.

KARL BROMIG.